US012016805B2

(12) United States Patent
Voorwinde et al.

(10) Patent No.: US 12,016,805 B2
(45) Date of Patent: Jun. 25, 2024

(54) DEVICE FOR SUPPORTING A PERSON, METHOD FOR INFLUENCING THE SHAPE OF A SUPPORT FOR SUCH, AND RELATED PILLOW, CHAIR, MATTRESS, AND BED

(71) Applicants: Hans Voorwinde Beheer B.V., Papendrecht (NL); Tinke 7 Mei B.V., Barendrecht (NL)

(72) Inventors: Hans Voorwinde, Papendrecht (NL); Cornelis Willem Tinke, Barendrecht (NL)

(73) Assignees: HANS VOORWINDE BEHEER B.V., Papendrecht (NL); TINKE 7 MEI B.V., Barendrecht (NL)

( * ) Notice: Subject to any disclaimer, the term of this patent is extended or adjusted under 35 U.S.C. 154(b) by 0 days.

(21) Appl. No.: 18/172,159

(22) Filed: Feb. 21, 2023

(65) Prior Publication Data
US 2023/0190552 A1    Jun. 22, 2023

Related U.S. Application Data

(63) Continuation of application No. 17/058,780, filed as application No. PCT/NL2019/050305 on May 28, 2019, now Pat. No. 11,786,422.

(30) Foreign Application Priority Data

May 29, 2018   (NL) ........................ 2021000

(51) Int. Cl.
*A61G 5/10*   (2006.01)
*A47C 7/14*   (2006.01)
(Continued)

(52) U.S. Cl.
CPC ............ *A61G 5/1045* (2016.11); *A47C 7/144* (2018.08); *A47C 7/28* (2013.01); *B60N 2/7047* (2013.01); *B60N 2/72* (2013.01)

(58) Field of Classification Search
None
See application file for complete search history.

(56) References Cited

U.S. PATENT DOCUMENTS 6,392,550 B1    5/2002  Najor
8,616,654 B2 *  12/2013 Zenk ..................... B60N 2/914
                                                297/284.6
(Continued)

FOREIGN PATENT DOCUMENTS

CN        1822781 A    8/2006
CN      104487041 A    4/2015
(Continued)

OTHER PUBLICATIONS

Search Report issued in Chinese Patent Application No. 2019800503177 dated Nov. 6, 2022.
(Continued)

*Primary Examiner* — David E Allred
(74) *Attorney, Agent, or Firm* — NIXON & VANDERHYE (57) ABSTRACT

A support device has a main support surface for a person's body, including an auxiliary device influencing the main support surface shape. The auxiliary device includes: a group of supports supporting the main support surface, positioned on the side of the main support surface facing away from the body-supporting side, the supports each including a sub-support surface; an adjuster for each sub-support surface influencing the height of each sub-support surface. The device also includes a monitor for each sub-support surface monitoring the height of the respective sub-support surface; and a programmable control unit controlling the adjuster. The supports include an elastically bendable plate connected to the adjuster. The bending plate is connected to the sub-support surface to influence its height depending on the extent of bending imposed by the
(Continued)

adjuster. The adjuster includes an electromotor on the concave side of the bending plate.

23 Claims, 6 Drawing Sheets (51) Int. Cl.
*A47C 7/28* (2006.01)
*B60N 2/70* (2006.01)
*B60N 2/72* (2006.01)

(56) References Cited

U.S. PATENT DOCUMENTS

| | | | |
|---|---|---|---|
| 9,486,160 B2 * | 11/2016 | Russell | A61B 5/1036 |
| 10,293,718 B1 | 5/2019 | Ilievski et al. | |
| 2003/0109817 A1 | 6/2003 | Berl | |
| 2004/0245827 A1 | 12/2004 | Bedford et al. | |
| 2004/0249536 A1 * | 12/2004 | Hattori | B60N 2/002 |
| | | | 701/45 |
| 2010/0101026 A1 | 4/2010 | Papaioannou | |
| 2012/0223554 A1 * | 9/2012 | Lem | B60N 2/976 |
| | | | 297/284.3 |
| 2013/0205501 A1 * | 8/2013 | Robertson | A61G 7/015 |
| | | | 5/617 |
| 2015/0000044 A1 * | 1/2015 | Morimura | A47C 27/083 |
| | | | 5/710 |
| 2015/0321590 A1 * | 11/2015 | Mizoi | B60N 2/80 |
| | | | 297/284.1 |
| 2016/0022520 A1 * | 1/2016 | Streeter | A61B 5/1036 |
| | | | 137/625.46 |
| 2016/0135603 A1 | 5/2016 | Chan et al. | |
| 2016/0184155 A1 * | 6/2016 | Streeter | A61G 7/05707 |
| | | | 700/282 |
| 2018/0178693 A1 * | 6/2018 | Iyer | B60N 2/002 |
| 2018/0281621 A1 | 10/2018 | Kaku et al. | |
| 2019/0183255 A1 | 6/2019 | Louks et al. | |
| 2020/0360210 A1 * | 11/2020 | Zoni, III | A47C 27/144 |
| 2021/0307534 A1 | 10/2021 | Krenik | |
| 2022/0133563 A1 | 5/2022 | Audic et al. | |
| 2022/0212578 A1 | 7/2022 | Roulund | |

FOREIGN PATENT DOCUMENTS

| | | | | |
|---|---|---|---|---|
| CN | 105263367 A | | 1/2016 | |
| DE | 20 2006 003 948 U1 | | 8/2006 | |
| FR | 3 013 328 A1 | | 5/2015 | |
| GB | 1 377 738 A | | 12/1974 | |
| IN | 104507362 A | | 4/2015 | |
| WO | 2006/098616 A1 | | 9/2006 | |
| WO | 2011/092970 A1 | | 8/2011 | |
| WO | 2013/112828 A1 | | 8/2013 | |
| WO | 2013/116438 A2 | | 8/2013 | |
| WO | WO-2021072461 A1 * | | 4/2021 | A47C 31/123 |
| WO | WO-2022145911 A1 * | | 7/2022 | |

OTHER PUBLICATIONS

International Search Report for PCT/NL2019/050305 dated Aug. 20, 2019, 5 pages.
Written Opinion of the ISA for PCT/NL2019/050305 dated Aug. 20, 2019, 7 pages.

* cited by examiner

Fig. 5

DEVICE FOR SUPPORTING A PERSON, METHOD FOR INFLUENCING THE SHAPE OF A SUPPORT FOR SUCH, AND RELATED PILLOW, CHAIR, MATTRESS, AND BED

CROSS REFERENCE TO RELATED APPLICATIONS

This application is a Continuation of application Ser. No. 17/058,780, filed on Nov. 25, 2020, which is the National Phase under 35 U.S.C. § 371 of International Application No. PCT/NL2019/050305, filed on May 28, 2019, which claims the benefit under 35 U.S.C. § 119(a) to Patent Application No. 2021000, filed in the Netherlands on May 29, 2018, all of which are hereby expressly incorporated by reference into the present application.

BACKGROUND OF THE INVENTION

Field of the Invention

The invention relates to a device for supporting persons. The person using the device can be supported while sitting or recumbent. A field of application of the invention is aimed at improving the comfortableness of the person in question, in particular when the person needs to be supported for a long period of time, such as in the transport sector, in particular truck drivers and couriers. Another field of application is aimed at medical effects, in particular counteracting decubitus (bedsores), such as for sitting or recumbent persons. Another field of application is occupational therapy.

Description of the Related Art

It is known to design such a device, intended for one or more of the above-mentioned applications, with a primary or main support surface/contact surface for a person's body, and with a group of support elements positioned below the main support surface and each defining a secondary or sub-support surface on which the main support surface supports. By adjusting the height of each of the sub-support surfaces in a controlled manner, the shape of the main support surface can be influenced while the person sits or lies on it.

SUMMARY OF THE INVENTION

It is an object of the invention to provide a support device of the type mentioned in the preamble with which an accurate local setting of the shape of the support surface for the user is possible.

It is an object of the invention to provide a support device of the type mentioned in the preamble with which, considered in the vertical sense, the shape of the support surface for the user can be adjusted to a large extent to the actual situation.

It is an object of the invention to provide a support device of the type mentioned in the preamble which can be compact in the vertical sense.

It is an object of the invention to provide a support device of the type mentioned in the preamble with which an accurate distribution of the forces exerted thereon by the user can be achieved.

According to one aspect the invention provides a support device having a main support surface for the body of a person, comprising an auxiliary device for influencing the shape of the main support surface, wherein the auxiliary device comprises:

a group of support elements for supporting the main support surface, which group is positioned on the side of the main support surface that faces away from the body-supporting side, wherein the support elements each comprise a sub-support surface, adjustment means for each sub-support surface for influencing the height of each sub-support surface relative to a reference plane and consequently the local height of the main support surface, monitoring means for each sub-support surface for monitoring the height of the respective sub-support surface relative to the reference plane and/or the force exerted on the respective sub-support surface by the person, and a programmable control unit for controlling the adjustment means in response to data received from the monitoring means, wherein the support elements each comprise an elastically bendable plate (bending plate) that is connected to the adjustment means so as to be influenced thereby in its extent of bending, wherein the bending plate is connected to the sub-support surface in order to influence its height depending on the bent condition as imposed by the adjustment means, wherein the adjustment means each comprise an electromotor that is situated on the concave side of the bending plate.

The support device according to the invention provides the possibility of adjusting either the shape of the main support surface, or the distribution of the forces exerted on it by the user, in response to the actual condition. The combination of adjustment means and electromotor, which preferably is a stepper motor, for each sub-support surface, the monitoring means and the bending plates make it possible to influence, in particular adjust the sub-support surfaces and consequently the main support surface, accurately. The occupation of space in the vertical sense can then be kept limited as the electromotor and the bending plate in the vertical sense can at least partially coincide, the electromotor can at least be partially surrounded by the bending plate, as it were. In one embodiment, the bending plate is positioned with the concave side at its bottom side.

Accurate influencing, in particular adjustment, can be furthered if the support elements each comprise two bending plates situated one above the other, which face each other with their concave sides, wherein the electromotor is situated between both bending plates. In that case the electromotor adds no constructional height to the support element.

In a compact embodiment the electromotor is attached to one end of the bending plate or to adjacent ends of both bending plates to be jointly displaced with them, wherein the adjustment means furthermore comprise a drive member that is driven by the electromotor and at one end is connected in a driving fashion to the other end of the bending plate or the other ends of both bending plates. The drive member can then be a shaft, such as a spindle, which is linearly moved by the electromotor, in particular stepwise (stepper motor).

In a further development of the support device according to the invention it comprises a frame and bending elements that are elastically bendable in the vertical plane and by means of which the respective support elements are attached to the frame, wherein the monitoring means comprise sensors for monitoring the bend of the bending elements and/or the force the user exerts on the bending elements, wherein the sensors are connected to the control unit for giving it signals that are indicative of the bend of the bending elements and/or the force exerted on the bending elements, wherein the control unit is configured for on the basis of the signals received from the sensors calculating the vertical position of the support element and/or the force exerted on the bending elements. The bending elements deform as a result of the load on the respective support elements and in addition to a support function to the support elements also have a function in providing information about the forces that arise.

In a simple and reliably functioning embodiment, the bending elements each comprise an elastically bendable beam, wherein the sensors each comprise a resistance strain gauge disposed on the beam.

In a further development thereof, the beam is clamped at one end and free at the other end.

In one embodiment, in which the support elements are provided with a bending plate on one side of the electromotor only, the electromotor is attached to the beam.

In an alternative embodiment, in which the support element comprises a bending plate on one side of the electromotor only, that support plate is attached to the beam. In the case of support plates on both sides of the electromotor, the support plate which is situated on one of either sides of the electromotor can be attached to the beam.

In a space-saving embodiment the location of attachment is in the center (the longitudinal center between both ends) of the respective bending plate.

In case of a cantilever beam, the location of attachment can be at the free end of the beam, as a result of which the displacement under vertical force is as large as possible, which can be conducive to a fine-tuning.

In one embodiment, the bending plate is, or both bending plates are, positioned such that the horizontal distance between both ends of each bending plate is changed when the respective bending plate bends. The center of each bending plate is then vertically displaced upon bending.

For each support element a stop can be arranged for limiting the vertical downward travel of the bending element.

The sub-support surface can be integrally formed with the bending plate.

In a further development, the sub-support surface of each support element is flat, in particular in the horizontal plane. That way the curvature of a bending plate of which the convex side is facing upward, can be made less noticeable to a person supported on the main support surface. The flat sub-support surface can be integrally formed with the respective bending plate. Alternatively, the flat sub-support surface can be part of a small plate added to the respective bending plate, which small plate preferably is attached to the bending plate in a relatively movable fashion. The small plate can then be attached to the respective bending plate so as to hinge, preferably so as to hinge in all directions (universally), such as with a ball hinge. The small plate is then in body-tracing position, which may be pleasant to the user.

According to a further aspect the invention provides a support device having a main support surface for the body of a person, comprising an auxiliary device for influencing the shape of the main support surface, wherein the auxiliary device comprises:

a group of support elements for supporting the main support surface, which group is positioned on the side of the main support surface that faces away from the body-supporting side, wherein the support elements each comprise a sub-support surface, adjustment means for each sub-support surface for influencing the height of each sub-support surface relative to a reference plane and consequently the local height of the main support surface, monitoring means for monitoring a parameter that is indicative of the force exerted on each sub-support surface by the person, and a programmable control unit that is connected to the monitoring means for receiving the data regarding the respective parameter, wherein the control unit is configured for:

on the basis of the data received from the monitoring means calculating the individual force $F1, F2, \ldots, Fn$ exerted on each sub-support surface by the person, calculating the average "Fmean" of the calculated forces $F1, F2, \ldots Fn$, comparing the calculated forces $F1, F2, \ldots Fn$ to the calculated Fmean, and on the basis of the outcome of said comparison, controlling the adjustment means to change the height of the respective sub-support surface in order to, in case of a difference between the calculated individual force on a sub-support surface and the calculated Fmean, reduce that difference. The average "Fmean" can be determined as arithmetic average.

In one embodiment, only those sub-support surfaces that the person actually places a load on, in other words the active support elements, are included in the calculations.

In one embodiment, the control unit is configured for repeatedly receiving from the monitoring means, the data for each of the support elements of which the adjustment means are controlled, and each time on the basis of those data calculating the force exerted on the sub-support surface and then once more calculating the average force and making the said comparison, and subsequently on the basis of the outcome of said comparison controlling the adjustment means once more. This amounts to a control system in which the sub-support surfaces are adjusted in height stepwise and the effect adjustment of the one sub-support surface has on the loading of the other sub-support surfaces is taken into account. Ultimately, it is possible to approximate a situation in which the person exerts the same force on each sub-support surface.

In one embodiment the control unit is configured for allowing the user to make a selection of the support elements that do or do not have to be controlled by the control unit during use. The control unit can then be configured for putting the support elements selected not to be controlled, in the lowest position, at least in a low position as a result of which they will be able to remain free from being loaded by the user. For instance, a user wishing to off-load a particular part of his body, such as may for instance be the case when the user has a bedsore, can place the support elements that would otherwise provide support to the area of that spot in the lowest position in order to ensure that during use that area will not or hardly be loaded. When the user usually seats himself on one and the same chair and usually takes up the same position and place, this may be an advantageous option.

In one embodiment, the control unit is configured for also after to an at least acceptable extent achieving an evenly distributed load, continuing the said control process, to detect the person's displacement relative to the sub-support surfaces and controlling the adjustment means accordingly to a new roughly evenly distributed loaded condition of the sub-support surfaces.

As described above, the support elements can each comprise an elastically bendable plate that is connected to the adjustment means to be adjusted thereby in its the extent of bending, wherein the bending plate is connected to the sub-support surface to influence its height depending on the extent of bending.

In this case as well the adjustment means can each comprises an electromotor that is situated on the concave side of the bending plate.

According to a further aspect, the support device can be equipped with one or more of the features described in claims 1-19.

According to a further aspect, the invention provides a method for influencing the shape of a main support surface of a support device for a person, using an auxiliary device for influencing the shape of the main support surface, which auxiliary device comprises:

a group of support elements for supporting the main support surface, which group is positioned on the side of the main support surface that faces away from the body-supporting side, wherein the support elements each comprise a sub-support surface, wherein adjustment means are present for each sub-support surface for influencing, in particular adjusting, the height of each sub-support surface relative to a reference plane and consequently the local height of the main support surface; which adjustment means are operable by a programmable control unit, wherein the shape of the main support surface is influenced by influencing, in particular adjusting, the height of at least a number of the sub-support surfaces relative to a reference plane and consequently the local height of the main support surface, wherein the method comprises the following steps:

a) allowing the control unit to operate the adjustment means for bringing each sub-support surface in a predetermined position;

b) allowing a person to take place on the main support surface;

c) after a period of time, for instance 10 seconds, per sub-support surface calculating the (actual) forces F1, F2, . . . Fn the person exerts on each of the sub-support surfaces;

d) calculating the average "Fmean" of the calculated forces F1, F2, . . . Fn, e) comparing the calculated forces F1, F2, . . . Fn to the calculated Fmean, and f) on the basis of the outcome of said comparison, controlling the adjustment means to change the height of the respective sub-support surface in order to, in case of a difference between the calculated individual force on a sub-support surface and the calculated Fmean, reduce that difference. The average "Fmean" can be determined as arithmetic average.

The series of steps c)-f) can be carried out repeatedly, with short intervals that are in the order of (for instance a part of a second) the period of time required for measuring, calculating and operating the adjustment means, which adjustment means preferably comprise a stepper motor. Said intervals can be a part of a second. Ultimately, a situation could then be achieved in which all loaded support elements are roughly evenly loaded. Pressure peaks can be prevented.

In one embodiment, the series of steps c)-f) are carried out for as long as the person is supported on the main support surface. That way a change in the posture and/or position of the person can be anticipated. A delay may have been set, for instance of a few seconds, in order for the system not to seem too unquiet to the user.

In one embodiment, in step c) only the actual force exerted on the sub-support surfaces that are used by the person is calculated. When changing position that may be a different group than previously.

In one embodiment, in step a) the sub-support surfaces are set at equal height. This may be a height in between the maximum and minimum height.

In one embodiment, prior to step c), in particular prior to step b), the user makes a selection of the support elements that do or do not need to be controlled by the control unit during use. The user can then direct the control unit to place support elements selected not to be controlled in the lowest position. Those will not be loaded by the user's body, which may be advantageous when the user wishes to off-load a possible support surface of his body.

In the method according to the invention, advantageous use can be made of a support device according to the invention as described above and/or in the attached claims.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

BRIEF DESCRIPTION OF THE DRAWINGS

The invention will be elucidated on the basis of an exemplary embodiment shown in the attached drawings, in which.

DESCRIPTION OF THE PREFERRED EMBODIMENTS

Figure 1:
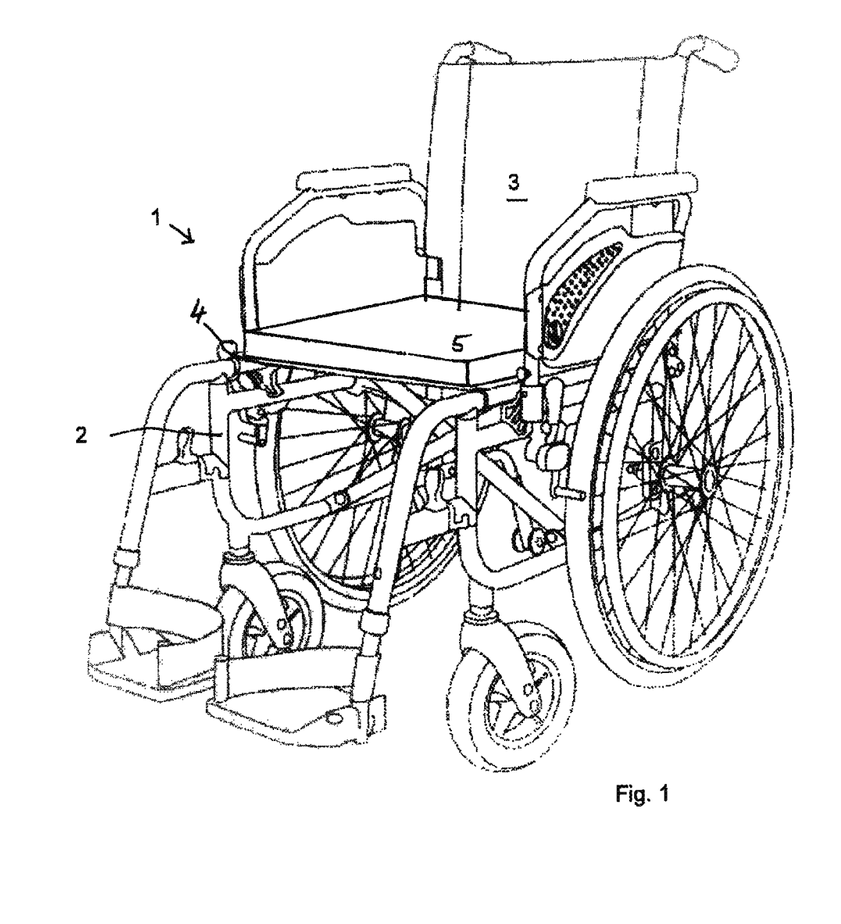
FIG. 1 shows a wheelchair provided with a seat cushion in which the support device according to the invention is incorporated.

The wheelchair 1 in FIG. 1 is an example of an application of a support device according to the invention. The support device according to the invention can be used in any situation in which a person needs to be supported in the sitting or recumbent position: both in chairs and in beds.

The wheelchair 1 comprises a frame 2 supported by wheels, on which frame a backrest 3 and a seat 4 are arranged. On the seat 4 a cushion 5 is placed, in which an example of a support device 10 according to the invention is incorporated.

Figure 2A:
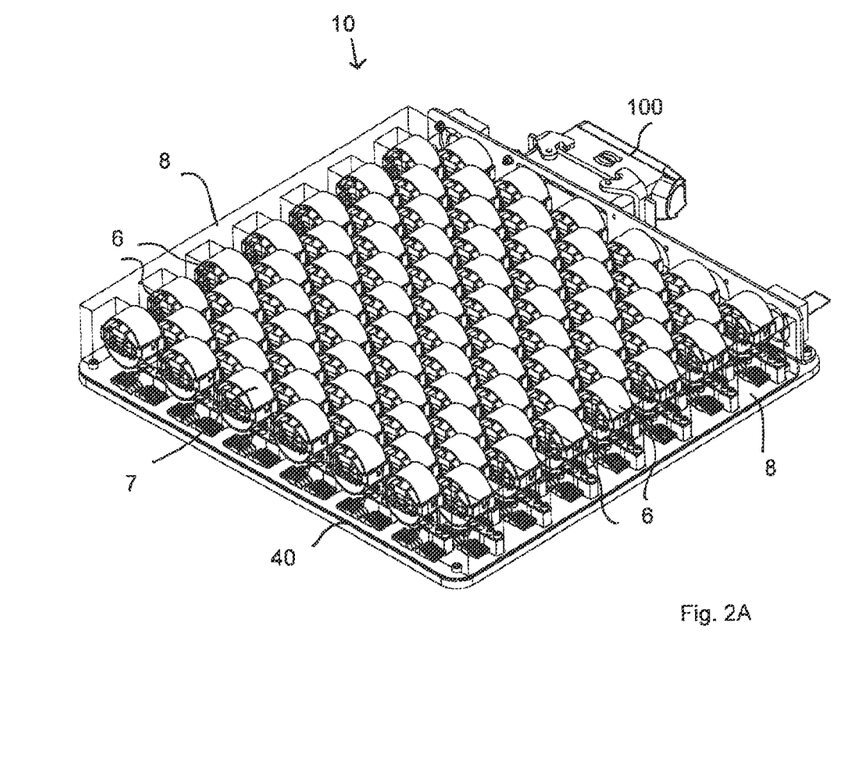
FIGS. 2A and 2B show an isometric view diagonally from above of a support device according to the invention and a side view of it, with addition, respectively.
Figure 2B:
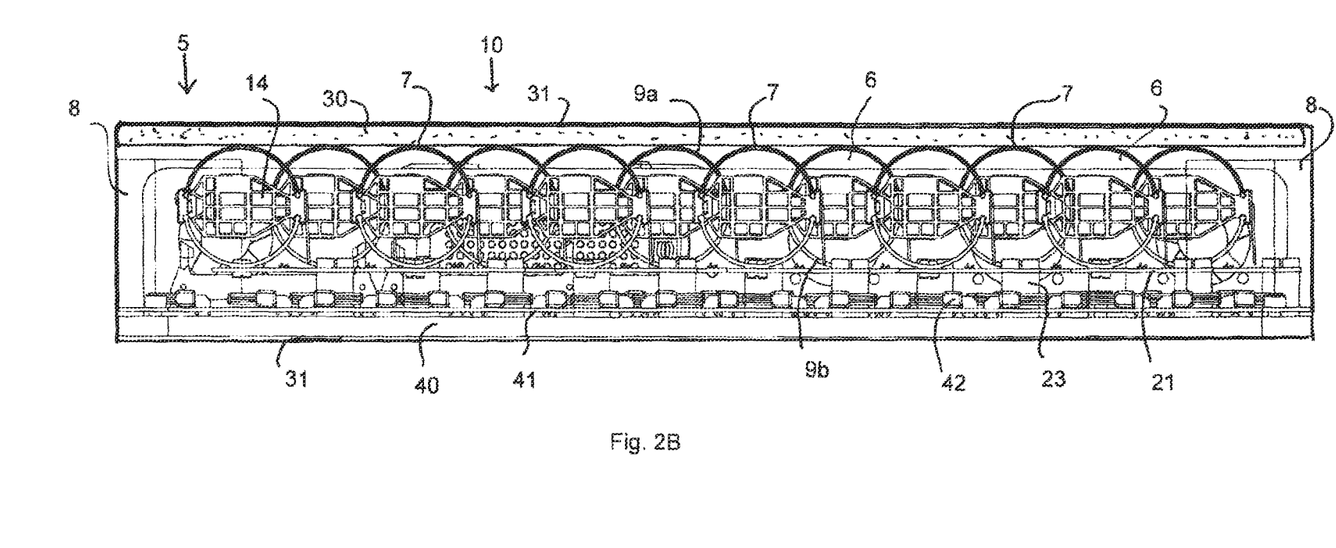

In FIGS. 2A and 2B the support device 10 is shown in further detail. The support device 10 comprises a group of support elements 6 that are positioned in a number of series, wherein the consecutive series are shifted relative to each other along half a length of the support element 6. The group of support elements is surrounded all around by a band 8 of synthetic foam, of which only two sides are shown. The support elements 6 are attached to a rigid base plate 40 on which slightly above it a printed circuit board 41 including connections 42 is also situated. At their top sides, the support elements 6 each form a sub-support surface 7, wherein the sub-support surfaces 7 are covered by a layer of foam rubber 30 and the whole is surrounded by an enveloping 31, see FIG. 2B, which enveloping forms a main support surface. The main support surface and the layer of foam rubber is supported on the sub-support surface. The support device is provided with a programmable control unit 100, provided with a power source, such as a battery.

Figure 3A:
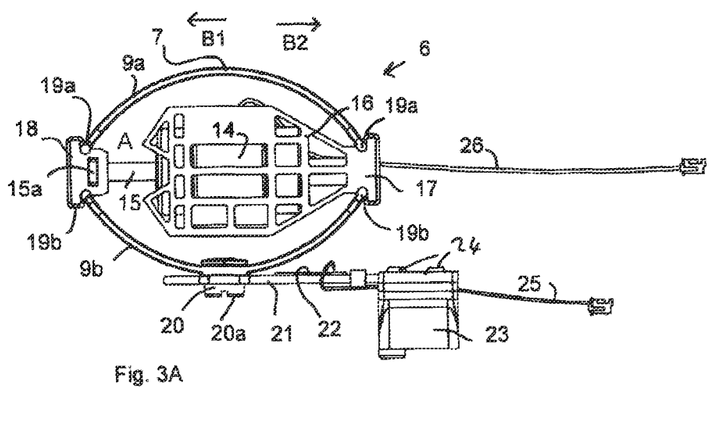
FIGS. 3A-F show three views of the support element of the support device of FIGS. 2A and 2B in different views and in different conditions, respectively.
Figure 3B:
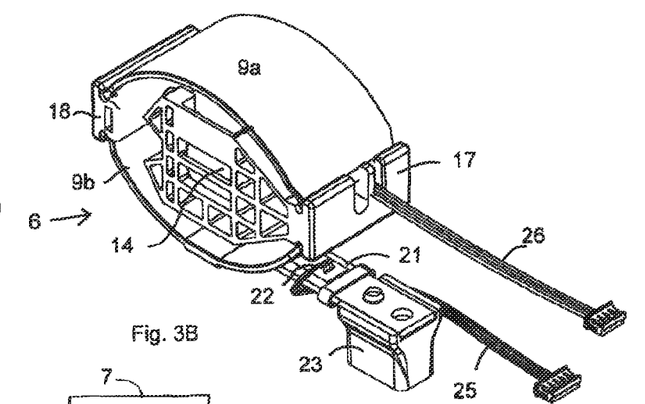
Figure 3C:
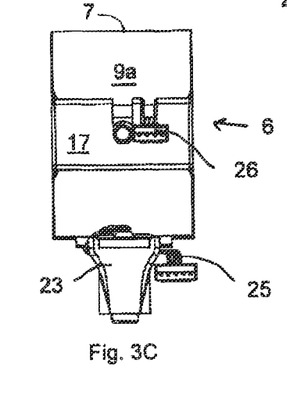

A support element 6 is shown in further detail in FIGS. 3A-C. The support element 6 comprises two elastically bendable bending plates 9a, 9b, which are bent upward and downward, respectively, in a convex fashion. The bending plates 9a,b can be manufactured of synthetic material, such as a nylon. A space A is formed between concave sides of the bending plates 9a,b, in which space an electromotor is accommodated, in the example stepper motor 14. The stepper motor 14, which is connected to a connector 42 on the printed circuit board 41 via wiring 26 and to the control unit 100 via the printed circuit board 41, is attached to a cut-away housing 16, and drives a shaft 15 in horizontal directions B1,2. The end 15a of the shaft 15 is attached in an end block 18, with which the beaded edge-shaped ends 19a of the bending plate 9a and the beaded edge-shaped ends 19b of the bending plate 9b are connected so as to hinge in the vertical plane. The other ends of the bending plates 9a and 9b are similarly connected to the end block 17 which is integral with the housing 16.

In its center, the lowermost bending plate 9b (considered both in the longitudinal direction and in the width direction) is attached by a bolt connection 20 near the free end of a flat, beam 21 clamped on one side, which beam is elastically bendable in the vertical plane. At the other end, the beam 21 is attached to a support block 23 in a rigidly clamped fashion by means of screws 24, which support block is rigidly attached to the rigid plate 40.

The bolt connection 20 has a head 20 a extending downward, which is situated above a stop (not shown) that is attached to the plate 40 and extends upwards therefrom. This stop limits the downward displacement of the free end of the beam 21.

A resistance strain gauge 22 is arranged on the beam 21, which gauge is connected to a connector 42 on the printed circuit board 41 via wiring 25, and to the control unit 100 via the printed circuit board 41.

Figure 3D:
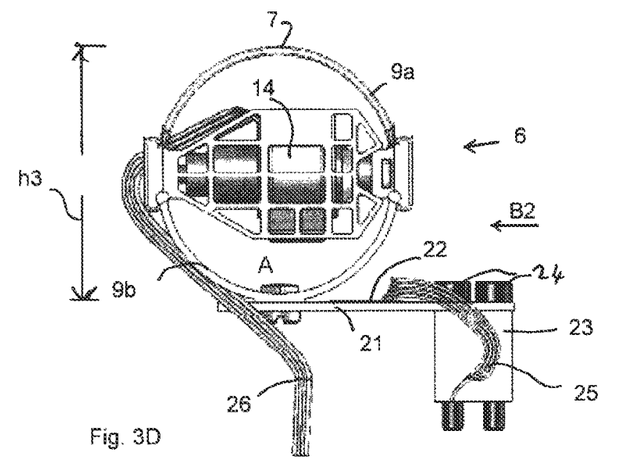
Figure 3E:
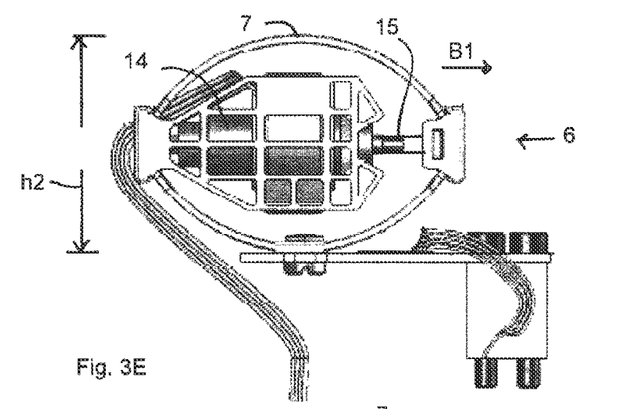
Figure 3F:
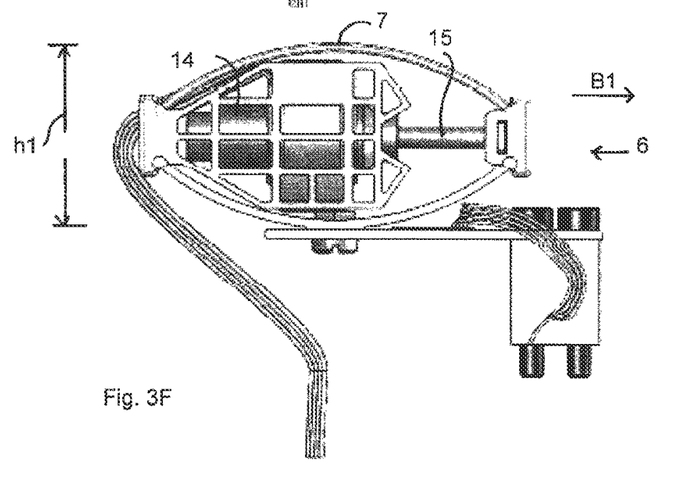

In FIGS. 3D-F it is shown how by means of operating the support elements 6 by the control unit 100, the vertical distance between the top and bottom of the bending plate 9a and bending plate 9b, respectively, can be influenced. In FIG. 3D the shaft 15 is fully retracted in direction B2 into the stepper motor 14. The height h3 of the support element 6 is then at its maximum. When the stepper motor 14 extends the shaft 15 (direction B1) the horizontal distance between the end blocks 17 and 18 will be increased, as a result of which the height h2 of the support element 6 decreases, see FIG. 3E. When the shaft 15 has been extended to its maximum, FIG. 3F, the height h1 is at its minimum. When the shaft 15 is retracted (direction B2) the height will increase again.

Figure 4:
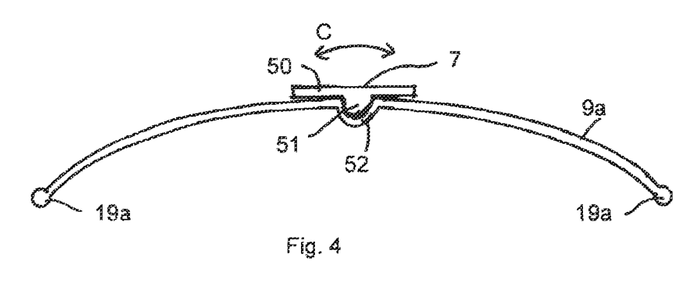
FIG. 4 shows a schematic view of a bending plate of a support element, in an alternative embodiment.

FIG. 4 shows an embodiment of the bending plate 9a, in which the sub-support surface 7 is formed by a small flat plate 50, which at the bottom side is provided with a bearing ball 51, that is accommodated so as to be rotatable, directions C, in bearing cavity 52, that is integrally formed with the bending plate 9a.

Figure 5:
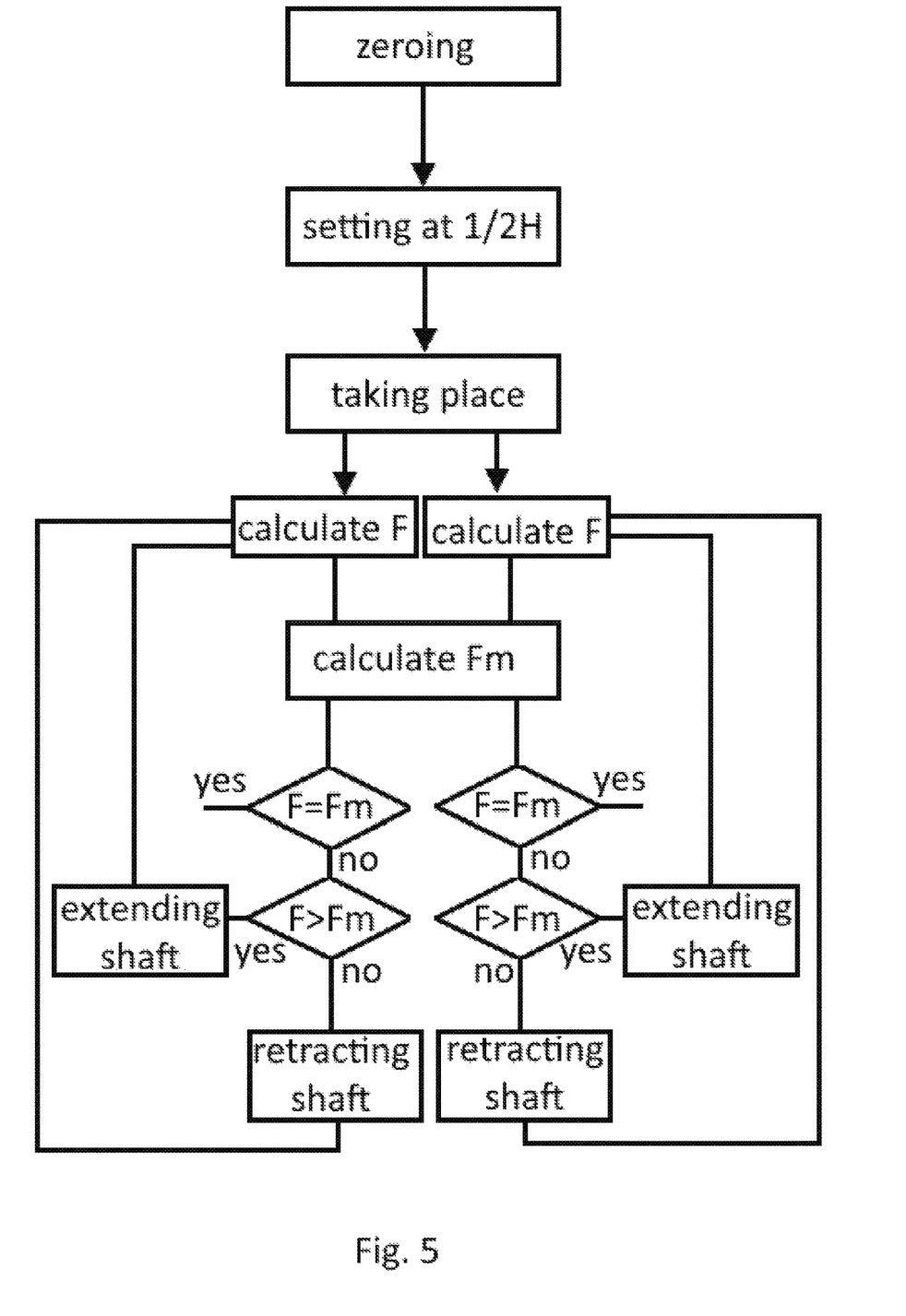
FIG. 5 shows a flow chart of an example of the user process of a support device according to the invention.

In actual practice, once a user has left the support device, for instance placed on the wheelchair of FIG. 1, and the support device therefore is not loaded, the control unit 100 will control the stepper motors 14 of all support elements 6 into a retracted position of the shafts 15. In the control unit the related condition of the resistance strain gauges 22 is stored as zero-setting. The support device has then been calibrated or "zeroed", also see the chart in FIG. 5. Zeroing or calibrating is also possible by fully extending all shafts. The control unit 100 will subsequently control the stepper motors 14 for extending the shafts 15 to half an extension length. The support device is then ready for use.

When the user takes his seat on the support surface, a force exerted by the user's body on the one support element 6 will be larger than on the other support element. Some support elements, especially those at the edges of the support device, will not be loaded.

The load on the support elements 6 will result in the respective beam 21 bending through, causing a change in the condition of the resistance strain gauge 22 attached to it. This change is detected in the control unit 100, which by using the data of the resistance strain gauge calculates the force exerted on the beam 21. This is done for all loaded support elements. The control unit 100 subsequently calculates the arithmetic average value of those forces.

In the control unit 100, the force F1, F2, . . . Fn calculated for each loaded support element is then compared to the calculated average force Fmean (in the figure called Fm). If the outcome is that the force on the support element exceeds Fmean, then the stepper motor for that support element is controlled so as to extend the shaft one step, for instance 2 mm. As a consequence the convexity of both bending plates 9a,b will decrease, as a result of which the sub-support surface 7 of that support element 6 will come to lie lower. If the outcome is that the force on the support element is smaller than Fmean, then the stepper motor for that support element is controlled so as to retract the shaft one step. As a consequence the convexity of both bending plates 9a,b will increase, as a result of which the sub-support surface 7 of that support element 6 will come to lie higher. On the sub-support surfaces then adjusted lower, the force exerted by the user will become lower, and on the sub-support surfaces adjusted higher it will indeed increase. After this measuring and calculation step and adjustment step, the process is repeated over and over again until F1, F2 . . . Fn roughly equal Fmean.

Subsequently, with the user on the support device, said steps are continuously carried out, so that a change of posture of the user can remain without adverse effects.

Controlling the electromotors 14 of the support elements 6 after the step of comparing the calculated forces F1, F2 . . . Fn to the Fmean, may in one embodiment take place in groups, such as that the wanted support elements of a first group of adjacent support elements are first operated and subsequently the wanted support elements of a second group, etc. This can be done in quick succession. The power required can be kept limited, which is advantageous when using a battery for the power supply of the electromotors.

The invention is/inventions are not at all limited to the embodiments described in the description and shown in the drawings. The above description is included to illustrate the operation of preferred embodiments of the invention and not to limit the scope of the invention. Starting from the above explanation many variations that fall within the spirit and scope of the present invention will be evident to an expert. Variations of the parts described in the description and shown in the drawings are possible. They can be used individually in other embodiments of the invention(s). Parts of the various examples given can be combined together.

The invention claimed is:

1. A support device having a main support surface for the body of a person, the support device comprising:
   an auxiliary device configured to influence the shape of the main support surface, the auxiliary device comprising:
      a group of support elements configured to support the main support surface, the group of support elements being positioned on a side of the main support surface that faces away from a body-supporting side, the support elements each comprising a sub-support surface,
      an adjustment device associated with each of the sub-support surfaces configured to influence a height of each of the sub-support surfaces relative to a reference plane and consequently a local height of the main support surface;
      a monitoring device associated with each of the sub-support surfaces, each of the monitoring devices being configured to monitor a parameter that is indicative of a force exerted on the associated sub-support surface by the person; and
      a programmable controller connected to the monitoring devices and configured to receive the data regarding the parameter, the programmable controller being configured to:
      calculate an individual force exerted on each of the sub-support surfaces by the person, based on the data received from the monitoring device, the individual force exerted being calculated only for the sub-support surfaces on which the person places a load,
      calculate an average of the calculated individual forces,
      compare the calculated individual forces to the calculated average, and
      control the adjustment device to change the height of the respective sub-support surface based on an outcome of the comparison when there is a difference between the calculated individual force on one of the sub-support surfaces and the calculated average in order to reduce the difference.

2. The support device according to claim 1, wherein the programmable controller is configured to
   repeatedly receive, from the monitoring device, the data for each of the support elements of which the adjustment device are controlled, and
   each time, based on the received data, calculate the force exerted on the sub-support surface,
   then, once more, calculate the average force and make the comparison, and
   subsequently, based on the outcome of said comparison, control the adjustment device once more.

3. The support device according to claim 1, wherein the programmable controller is configured to control the adjustment device of the one support element in coordination with the control of the adjustment device of at least one other support element.

4. The support device according to claim 1, wherein the programmable controller is configured to allow the user to make a selection of the support elements that do or do not have to be controlled by the programmable controller during use.

5. The support device according to claim 4, wherein the programmable controller is configured to put the support elements that are selected not to be controlled, in the lowest position.

6. The support device according to claim 1, wherein the programmable controller is configured to, after achieving a substantially evenly distributed load,
   continue the controlling the adjustment device to detect a displacement of the person relative to the sub-support surfaces, and
   control the adjustment device according to a new evenly distributed loaded condition of the sub-support surfaces.

7. The support device according to claim 1, wherein the support elements each comprise an elastically bendable bending plate that is connected to the adjustment device to be adjusted thereby in its extent of bending, the bending plate being connected to the sub-support surface to influence its height depending on the extent of bending.

8. The support device according to claim 7, wherein the adjustment devices each comprise an electromotor that is positioned on a concave side of the bending plate.

9. The support device according to claim 8, wherein the electromotor is positioned on a bottom side of the bending plate.

10. A pillow comprising:
    the support device according to claim 1.

11. A chair comprising:
    the pillow according to claim 10.

12. A mattress comprising:
    the support device according to claim 1.

13. A bed comprising:
    the mattress according to claim 12.

14. A method for influencing a shape of a main support surface of a support device for a person, using an auxiliary device to influence the shape of the main support surface, the auxiliary device including a group of support elements configured to support the main support surface, the group of support elements being positioned on a side of the main support surface that faces away from a body-supporting side, the support elements each including a sub-support surface, an adjustment device being present for each of the sub-support surfaces configured to influence a height of each sub-support surface relative to a reference plane and consequently a local height of the main support surface, said adjustment devices being operable by a programmable controller connected to a monitoring device associated with each of the sub-support surfaces, each of said monitoring devices being configured to monitor a parameter that is indicative of the force exerted on the associated sub-support surface by the person, the shape of the main support surface being influenced by influencing the height of at least a number of the sub-support surfaces relative to the reference plane and consequently the local height of the main support surface, the method comprising the following steps:

a) allowing the programmable controller to operate the adjustment devices to bring each of the sub-support surfaces in a predetermined position;
b) allowing a person to take a position on the main support surface;
c) calculating, in the programmable controller after a period of time and for each of the sub-support surfaces, actual forces the person exerts on each of the sub-support surfaces based on data regarding said parameter received from the monitoring devices, each of the actual forces exerted being calculated only for the sub-support surfaces on which the person places a load;
d) calculating the average of the calculated forces;
e) comparing the calculated forces to the calculated average; and
f) controlling the adjustment devices by the programmable controller to change the height of the respective sub-support surface based on an outcome of the comparison when there is a difference between the calculated individual force on one of the sub-support surfaces and the calculated average in order to reduce the difference.

15. The method according to claim 14, wherein the steps c)-f) are repeatedly carried out.

16. The method according to claim 15, wherein the steps c)-f) are carried out for as long as the person is supported on the main support surface.

17. The method according to claim 14, wherein, in the step a), the sub-support surfaces are set at equal height.

18. The method according to claim 14, wherein, in the step f), the programmable controller separately operates the adjustment devices of various sub-support surfaces.

19. The method according to claim 18, wherein, in the step f), the programmable controller separately operates the adjustment devices of adjacent sub-support surfaces.

20. The method according to claim 19, wherein, in the step f), the programmable controller operates the adjustment devices of adjacent sub-support surfaces one after the other.

21. The method according to claim 14, wherein, prior to one or more of the step b) and the step c), making a selection of the support elements that do or that do not have to be controlled by the programmable controller during use.

22. The method according to claim 21, wherein the programmable controller puts the support elements that are selected not to be controlled, in a low position.

23. The method according to claim 22, wherein the low position is a position such that the person is not able to place a load on the support elements that are selected not to be controlled.

* * * * *